Feb. 16, 1960 J. B. SNOY 2,924,941
HYDROKINETIC TORQUE CONVERTER HAVING
REACTOR BLADE PITCH REGULATOR
Filed April 13, 1956

INVENTOR
Joseph B. Snoy
BY
T. L. Chisholm
ATTORNEY

United States Patent Office 2,924,941
Patented Feb. 16, 1960

2,924,941

HYDROKINETIC TORQUE CONVERTER HAVING REACTOR BLADE PITCH REGULATOR

Joseph B. Snoy, Indianapolis, Ind., assignor to General Motors Corporation, Detroit, Mich., a corporation of Delaware Application April 13, 1956, Serial No. 578,064

17 Claims. (Cl. 60—54)

This invention relates to fluid dynamic machines having controllable variable pitch vanes or blades and more particularly to the control of the pitch of the blades in fluid dynamic machines in response to the flow of fluid.

In fluid dynamic machines where the fluid moves past the rotor blades to stator blades which redirect the fluid to the following rotor blades or the fluid outlet, the direction of the flow of the fluid varies with variations in the operating conditions of the machine. When stator blades are located at a fixed pitch angle, they will provide maximum efficiency only when the machine is operating at the design conditions. A variation in the operating conditions will change the direction of flow of the fluid approaching the stator blades and result in a less efficient operation. Thus in accordance with my invention the pitch angle of the stator blades is controlled to provide a constant relationship to the direction of the fluid approaching and flowing over the stator blades to provide the maximum design efficiency.

In hydrodynamic torque converters with fixed blades, the angle at which the fluid approaches the leading edge of the blades changes in accordance with variations in operating conditions such as the speed of the rotors and fluid. As the angle of the approaching fluid changes with respect to the blade, the angular change in direction of the fluid as it passes across the blade surface will also change resulting in a change in the force transfer between the fluid and the blade. In order to provide a more efficient transfer of force between the fluid and the blade as the fluid moves across the blade, it is desirable to control the angle of the blade to provide a fixed relationship between the blade and the direction of the approaching fluid. The blade which is to be controlled is thus provided with a governing mechanism responsive to the direction of flow of the fluid, such as the two pressure sensitive devices and signal lines from the pressure sensitive device, to a control mechanism, including a control valve and a motor, to control the position or pitch angle of the blade in accordance with the direction of the approaching fluid.

An object of the invention is to provide in a fluid dynamic machine, a variable pitch blade having a pressure sensitive device controlling an automatic pitch changing device to properly position the blade.

Another object of the invention is to provide in a fluid dynamic machine having variable pitch blades, a control mechanism responsive to the flow of fluid over the blade to properly position the blade to provide the desired efficient flow around the blade.

Another object of the invention is to provide in a fluid drive having a plurality of variable pitch blades, a pressure sensitive device on the blades surface governing a control which controls the position of the blade to align the blade with the direction of the approaching fluid.

Another object of the invention is to provide in a hydrokinetic torque converter a blade mounted for movement to vary the pitch angle, a pressure sensitive mechanism at the opposed surfaces of the blade adjacent the leading edge controlling a control mechanism to properly position the blade so that the leading edge is aligned with oncoming fluid to provide the desired efficient flow.

These and other objects of the invention will be more apparent from the following description of a preferred embodiment of the invention shown in the accompanying drawings in which.

Figure 1:
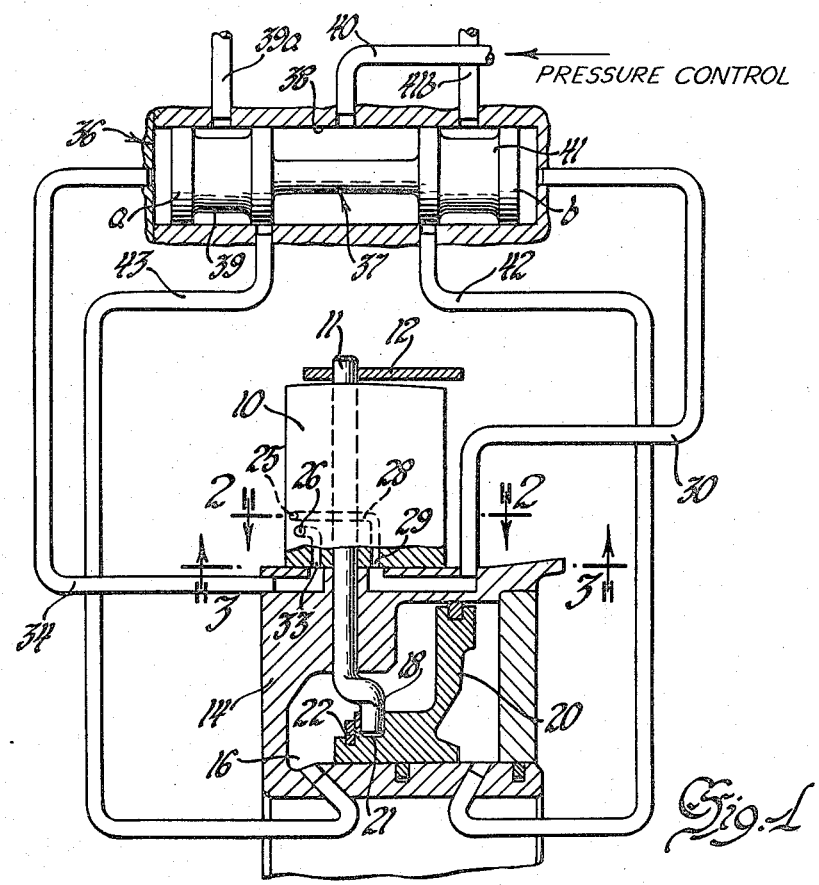
Fig. 1 is a diagrammatic showing of a blade and a suitable control system.

In accordance with the invention one or more of the annular series of blades in a fluid drive device; such as, a hydrodynamic torque converter having one or more series of pump, turbine and stator blades arranged in the conventional torus configuration, may be moved to change the pitch of the blades. The drawing illustrates the invention applied to a torque converter stator located in the passage of a torus chamber and having variable pitch blades 10 each of which is fixed to a shaft 11 rotatably mounted in guide bores in the stator shroud 12 and the stator shell 14. The shaft 11 extends through the guide bore in the outer portion of the shell 14 to the annular cylinder 16 and has on the end disposed in the cylinder 16 a crank arm 18. The annular piston 20 is reciprocably mounted within the cylinder 16 and has annular grooves formed by the shoulder 21 and snap ring 22 to receive a plurality of cranks 18, one for each blade 10. The cylinder 16 and piston 20 provide a fluid actuated motor for controlling the pitch of the blades.

Figure 2:
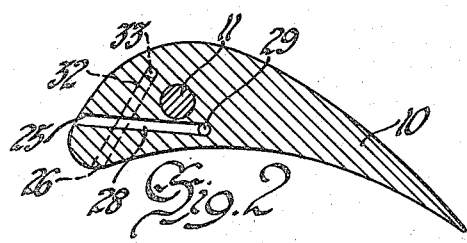
Fig. 2 is a section of the blade of Fig. 1 on the line 2—2.
Figure 3:
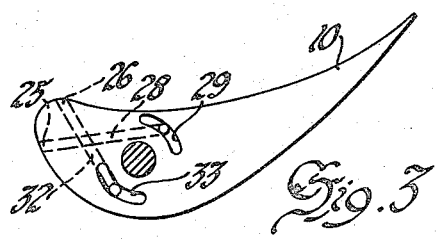
Fig. 3 is a section of the blade of Fig. 1 on the line 3—3.

The angle of the blade is preferably controlled by a system employing a governing mechanism, including a pressure sensitive device mounted on the blade 10 as best shown in Fig. 2. The pressure sensitive device provides a signal indicating the direction of flow of the fluid approaching the blade and impinging on the leading edge of the blades and consists of a pressure port 25 located at the back surface of the blade 10 and a pressure port 26 located at the front surface of the blade. The back pressure port 25 is connected by a passage 28, and transfer port 29 to the back signal line 30. The front pressure port 26 is connected by a passage 32 in the blade 10 and the transfer port 33 to the front signal line 34. The pressure ports 25 and 26 may also be connected through passages in shaft 11 and suitable annular transfer glands to signal lines 30 and 34. Thus the governing mechanism provides a signal indicative of the direction of flow of the fluid approaching and impinging on the leading edge of the blade which actuates a control mechanism including a control valve 36 and the fluid actuated motor. The signal lines 30 and 34 connect the signal pressure to actuate the control valve unit 36 which consists of the spool valve 37 located in a closed bore 38. The spool valve 37 has dual lands a and b at each end connected by a reduced central portion. Dual land a has a central vent groove 39 normally connected to vent port 39a and dual land b has a central vent groove 41 normally connected to vent port 41b. The back signal line 30 is connected to one end of the bore 38 and the front signal line 34 is connected to the opposite end of the bore 38 to act on opposed ends of the valve 37.

The supply of fluid under pressure is provided by supply line 40 which is connected to the center of bore 38 to supply fluid at all times to the space between the lands. The grooves 39 and 41 in lands a and b are connected to vent ports 39a and 41b to provide an exhaust and to prevent leakage past the lands from either the central supply portion of the bore or the control portions at the end of the bore to the other portion. With the valve 37 in the neutral position shown, the right control line 42 and the left control line 43 are blocked. When the pressure at the back and front ports 25 and 26 in the blade is equal indicating that the fluid is approaching the blade in alignment with the leading edge portion of the blade to provide the desired streamlined flow, the pressure in signal lines 30 and 34 is equal and both the control lines 42 and 43 are blocked to retain the blade at that angular setting or pitch angle.

If the pressure in front port 26, for example, increases indicating that the fluid is approaching the blade from the front side, increased pressure in signal line 34 will move valve 37 to the right in Fig. 1 connecting the pressure supply line 40 to control line 42 and control line 43 via groove 39 to vent port 39a. The fluid supplied by line 42 will move piston 20 to the left to move the blade to change the pitch angle so that the flow over the leading edge portion of the blade will be in alignment with the blade providing efficient streamline flow and equalizing pressure at ports 25 and 26 to move valve 37 to the neutral position to terminate blade movement.

If the fluid approaches blade from the back side of the blade so that the pressure at port 25 and signal line 30 is larger, then valve 37 will move to the left to connect the line 40 to left control line 43 and vent line 42 via groove 41 and port 41b which will move piston 20 to the right and change the blade angle to again align the leading portion of the blade with the approaching fluid providing streamline flow and equalize the pressure at ports 25 and 26 to return valve 37 to the neutral position to stop blade movement.

Figure 4:
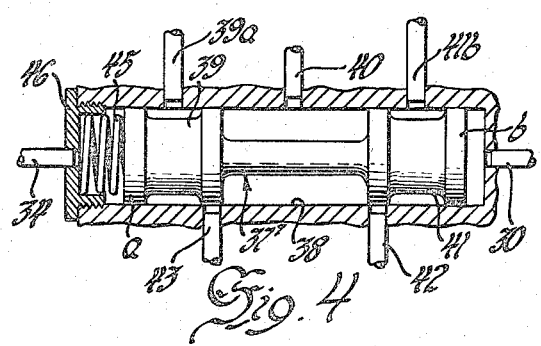
Fig. 4 is a section of a modified control valve.
Figure 5:
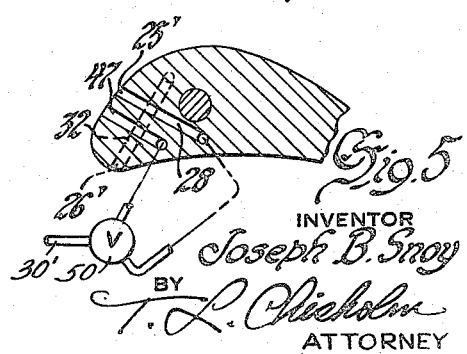
Fig. 5 is a section of a modified blade.

In certain torque converter designs, where it is desirable to align the blade with the flow over another portion of the blade, the ports 25 and 26 may be located at that portion of the blade. Where it is desirable to provide a smaller or larger change in the direction of flow of fluid across the blade, this mechanism can be controlled so that the leading edge of the blade is not in alignment with the approaching fluid but at a fixed angle to the direction of the approaching fluid. This may be done by moving one pressure port, 25, or 26 away from or toward the leading edge of the blade as shown by the pressure ports 25' and 26' of Fig. 5. It may also be done by placing a spring 45, which may be made longer to provide a more constant spring rate, between one end of the bore 38 and the valve 37' as shown in Fig. 4 or by using unbalanced lands a and b so that the neutral position of the valve will occur with a higher pressure at one pressure port than at the other port. It will also be appreciated that a single blade may be provided with various stages of control to set the blade at a different angle to the direction of the fluid flow. This may be done by employing an adjustable abutment 46 to change the tension of the spring 45 urging the valve 37' in one direction or by providing the blade with two or more pressure sensitive ports, such as ports 25' and 47 (Fig. 5) on one side of the blade spaced at different distances from the leading edge. The ports 25' and 47 are alternately connected by a conventional three way control valve 50 via line 30' which is the same as line 30 to one side of the valve 37 in conjunction with a single pressure port 26' at the other side of the blade connected to line 34 and the other side of valve 37 to permit control of the blade at one or another angular relationship with respect to the direction of the fluid flow.

This control system, which controls the blade angle in response to the pressure of the fluid flowing over the blade surface, may also be used in other fluid dynamic machines, such as pumps and turbines, particularly of the axial flow type and is particularly effective for stator blades located between two rows of rotor blades.

The above-described preferred embodiments are illustrative of the invention which may be modified by those skilled in the art within the scope of the appended claims.

The claims:

1. In combination, a fluid dynamic machine having a passage for fluid flow and a plurality of bladed fluid transmitting members in said passage, one of said members having a plurality of movable blades each having a leading edge and a trailing edge movably mounted to vary the pitch angle, flow direction detecting means located adjacent the leading edge and remote from the trailing edge of said movable blade providing a signal indicating the direction of the flow of fluid toward said blade before said direction of flow is materially affected by blade induced turbulence, and control means responsive to said signal to control the angle of said movable blade in a controlled relationship to the direction of flow of fluid toward and adjacent said leading edge of said one of said movable blades.

2. In combination, a fluid dynamic machine having a housing providing a passage for fluid flow, a plurality of bladed rotor members transmitting fluid through said passage, a bladed stator member fixed to said housing and located between two rotor members to redirect fluid from one rotor toward another rotor; said bladed stator having movable blades each having a leading edge and a trailing edge movably mounted to vary the pitch angle, governing means including flow direction sensing means located adjacent said leading edge and remote from said trailing edge responsive to the direction of flow of fluid toward said movable blades before the direction of flow is materially altered by blade induced turbulence to provide a governing force, and control means responsive to said governing force of said governing means to control the angle of said movable blades responsive to the direction of flow of said fluid.

3. In combination, a fluid drive having a passage with fluid therein and a plurality of fluid torque transmitting members in said passage, one of said members having a plurality of blades, said blades being movably mounted to vary the pitch angle, governing means responsive to the direction of flow of the fluid toward said blades, a source of power, motor means to control the pitch angle of said blades, and control means responsive to said governing means to connect said source to said motor means to control the angle of said blades responsive to said direction of flow of fluid.

4. In combination, a fluid dynamic machine having a passage with fluid therein and a plurality of fluid torque transmitting members in said passage, one of said members having a plurality of blades, said blades each having a leading edge and a trailing edge and front and back surfaces between said leading and trailing edges and being movably mounted to vary the pitch angle, governing means including pressure sensing means located adjacent the leading edge and remote from the trailing edge of one of said blades responsive to fluid pressure at the front and back surfaces adjacent the leading edge and remote from the trailing edge of said one of said blades to provide a governing force in accordance with said fluid pressures at said front and back surfaces, and control means responsive to said governing force of said governing means to control the angle of said blades responsive to the fluid pressure adjacent said surfaces of said one blade to move said leading edge of said blade toward the side having the higher pressure.

5. In combination, a fluid dynamic machine having a passage with fluid therein and a plurality of fluid torque transmitting members in said passage, one of said members having a plurality of blades, said blades each having a leading edge and a trailing edge and front and back surfaces between the lead and trailing edges and being movably mounted to vary the pitch, governing means including flow direction sensing means located adjacent said leading edge and remote from said trailing edge responsive to the flow of fluid adjacent a surface of one of said blades indicating the direction of flow of the fluid, and control means responsive to said governing means to control the angle of said blades responsive to the flow of fluid adjacent the surface of said one blade to maintain the leading portion of said blades at a constant angle with respect to the direction of the fluid flow.

6. In combination, a fluid dynamic machine having a passage with fluid therein and a plurality of fluid torque transmitting members in said passage, one of said members having a plurality of blades, said blades each having a leading edge and a trailing edge and front and back surfaces between the leading and trailing edges and being movably mounted to vary the pitch, governing means including flow direction sensing means responsive to the direction of flow of fluid adjacent a surface of one of said blades adjacent said leading edge and remote from said trailing edge, and control means responsive to said governing means to control the angle of said blades responsive to the flow of fluid adjacent the surface of said one blade to align the leading portion of said blades with the direction of the fluid flow.

7. In combination, a fluid dynamic machine having a passage with fluid therein and a plurality of fluid torque transmitting members in said passage, one of said members having a plurality of blades, said blades being movably mounted to vary the pitch, governing means responsive to the direction of flow of fluid adjacent the surface of one of said blades, control means responsive to said governing means to control the angle of said blades responsive to the flow of fluid adjacent the surface of said one blade to maintain the leading portion of said blades at controlled angle with respect to the direction of the fluid flow, and means to control said governing means and said control means to change said angle maintained between said blades and the direction of the fluid flow.

8. In combination, a hydrodynamic torque converter having a pump, a turbine and a stator member, one of said members having a plurality of blades, said blades each having a leading edge and a trailing edge and front and back surfaces between the leading and trailing edges and being movably mounted to vary the pitch, governing means including flow direction sensing means located adjacent said leading edge and remote from said trailing edge responsive to the direction of flow of fluid adjacent the surface of one of said blades adjacent the leading edge and remote from the trailing edge to provide a governing force, and control means responsive to said governing force of said governing means to control the angle of said blades responsive to the direction of flow of fluid adjacent the surface of said one blade.

9. In combination, a hydrodynamic torque converter having a pump, a turbine and a stator member, one of said members having a plurality of blades, said blades each having a leading edge and a trailing edge and front and back surfaces between the leading and trailing edges and being movably mounted to vary the pitch angle, governing means including pressure sensing means located adjacent said leading edge and remote from said trailing edge responsive to the relation between the fluid pressures at the front and back surfaces adjacent the leading edge and remote from the trailing edge of one of said blades to provide a governing force, and control means responsive to said governing force of said governing means to control the angle of said blades to maintain a constant relation between the fluid pressures adjacent the surfaces of said blades.

10. In combination, a hydrodynamic torque converter having a pump, a turbine and a stator member, one of said members having a plurality of blades, said blades being movably mounted to vary the pitch, governing means responsive to the direction of flow of fluid adjacent the surface of one of said blades, a source of power, motor means to control the pitch of said blades, and control means responsive to said governing means to connect said source to said motor means to control the angle of said blades responsive to the direction of flow of fluid adjacent the surface of said one blade.

11. The invention defined in claim 10 and said control means controlling the angle of said blades to maintain the leading portion of said blades at a constant angle with respect to the direction of said fluid flowing over said blades.

12. The invention defined in claim 11 and means controlling said governing means and said control means to provide a plurality of ranges of operation to maintain in each range a different angle between said blades and the direction of flow of the fluid.

13. In combination, a hydrodynamic torque converter having a pump, a turbine and a stator member, one of said members having a plurality of blades, said blades each having a leading edge and a trailing edge and front and back surfaces between the leading and trailing edges and being movably mounted to vary the pitch angle, governing means including a pair of pressure sensing ports sensing fluid pressure adjacent a surface of one of said blades indicating the direction of flow, and control means responsive to said governing means to control the angle of said blades responsive to the fluid pressure adjacent the surface of said one blade.

14. In combination, a hydrodynamic torque converter having at least a pump, turbine and stator member forming a fluid passage, one of said members having a plurality of blades, said blades each having a leading edge and a trailing edge and front and back surfaces between the leading and trailing edges and being movably mounted to vary the pitch angle, governing means including pressure sensing means located adjacent said leading edge and remote from said trailing edge responsive to fluid pressure at two points movable with said blades and located in said passage to provide a pressure indicating the direction of flow of the fluid at the front and back surfaces adjacent the leading edge and remote from the trailing edge of one of said blades, and control means responsive to said governing means to control the angle of said blades responsive to the fluid pressure adjacent the surface of said one blade.

15. In combination, a hydrodynamic torque converter having a pump, a turbine and a stator member each having a plurality of blades arranged in a torus configuration to provide torus flow, said stator blades being movably mounted to vary the pitch angle, governing means responsive to fluid pressure adjacent the surface of one of said blades indicating the direction of flow of the fluid, a source of power, motor means to control the pitch angle of said blades, and control means responsive to said governing means to connect said source to said motor means to control the angle of said blades responsive to the fluid pressure adjacent the surface of said one blade to provide a predetermined relationship between the angle of the blades and the direction of flow of the fluid.

16. In combination, a fluid drive having a chamber with fluid therein and a plurality of fluid torque transmitting members in said chamber, one of said members having a plurality of blades, said blades being movably mounted to vary the pitch angle, a source of power, motor means connected to said blades to vary the pitch angle, a pair of pressure sensing devices on said movable blades, and control means actuated by said pair of pressure sensing devices to position said control means in a first position connecting said source to said motor means to increase the pitch angle of said blades and a second position connecting said source to said motor means to decrease the pitch angle of said blades and a neutral position to hold the blades in any position.

17. In combination, a hydrodynamic torque converter having a pump, a turbine and a stator member, one of said members having a plurality of blades, said blades being movably mounted to vary the pitch angle, a source of power, motor means connected to said blades to vary the pitch angle, a pair of pressure sensing devices on said blade positioned to indicate the direction of flow of the fluid, and control means actuated by said pair of pressure sensing devices to position said control means in a first position connecting said source to said motor means to increase the pitch angle of said blades and a second position connecting said source to said motor means to decrease the pitch angle of said blades and a neutral position to hold the blades in any position.

References Cited in the file of this patent

UNITED STATES PATENTS

| | | |
|---|---|---|
| 2,187,937 | Sensaud de Lavaud | Jan. 23, 1940 |
| 2,205,794 | Jandasek | June 25, 1940 |
| 2,612,755 | Szczeniowski | Oct. 7, 1952 |

FOREIGN PATENTS

| | | |
|---|---|---|
| 444,171 | Great Britain | Mar. 16, 1936 |